US008774772B2

(12) United States Patent
Livyatan et al.

(10) Patent No.: US 8,774,772 B2
(45) Date of Patent: Jul. 8, 2014

(54) COMMUNICATIONS SERVICE BROKER FOR PREVENTING VOICEMAIL TROMBONING IN THE TELECOMMUNICATIONS NETWORK

(75) Inventors: Tzach Livyatan, Tel Aviv (IL); Ayal Itzkovitz, Haifa (IL); Tal Zoller, Haifa (IL); Nadav Kadosh, Givatayim (IL); Shlomo Livne, Ra'anana (IL)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/330,561

(22) Filed: Dec. 19, 2011

(65) Prior Publication Data

US 2012/0157061 A1 Jun. 21, 2012

Related U.S. Application Data

(60) Provisional application No. 61/425,692, filed on Dec. 21, 2010.

(51) Int. Cl.
*H04M 11/10* (2006.01)

(52) U.S. Cl.
USPC ............... 455/413; 455/414.1; 455/432.1; 455/433; 455/461

(58) Field of Classification Search
USPC ............ 455/404.2, 413, 414.1, 432.1, 432.3, 455/433, 461, 403, 412.1; 370/259–271; 379/157, 158, 201.01–218.02
See application file for complete search history.

(56) References Cited

U.S. PATENT DOCUMENTS

| | | | |
|---|---|---|---|
| 2007/0197213 A1* | 8/2007 | Weintraub et al. | 455/433 |
| 2007/0243875 A1 | 10/2007 | Gouthama et al. | |
| 2009/0117880 A1* | 5/2009 | Sipher | 455/412.2 |
| 2011/0045805 A1* | 2/2011 | Elkarat et al. | 455/413 |

FOREIGN PATENT DOCUMENTS

| | | |
|---|---|---|
| EP | 1777871 | 4/2007 |
| EP | 2 197 237 | 6/2010 |
| WO | 92/17950 | 10/1992 |
| WO | 2008/088913 | 7/2008 |
| WO | WO2009108188 | 9/2009 |

OTHER PUBLICATIONS

International Search Report dated Jun. 20, 2012 for Application No. PCT/US2011/066240, 10 pages.

(Continued)

*Primary Examiner* — Dinh P Nguyen
(74) *Attorney, Agent, or Firm* — Meyer IP Law Group

(57) ABSTRACT

A set of techniques are described for preventing the problem of voicemail tromboning. The techniques can be implemented with a service broker or other intermediate entity having a connection to a telecommunications network. The service broker can receive an incoming call from a switch in a home network of the subscriber. The service broker can then determine that a recipient device of the incoming call is roaming in a visited network. If it is determined that the subscriber is roaming, the service broker can contact a remote switch in the visited network and instruct the remote switch in the visited network to disable late call forwarding prior to relaying the incoming call message to the remote switch. The service broker can then be responsible for contacting the voicemail server in the home network of the subscriber so that the subscriber can still have access to voicemail.

17 Claims, 3 Drawing Sheets

(56) References Cited

OTHER PUBLICATIONS

Joyce B .Mwangama et al., "Charging and Billing for Composite Services in a Multi-Service Provider Environment: The IMS Case", Wireless Communications and Networking Conference (WCNC), 2010 IEEE, IEEE, Piscataway, NJ, USA, Apr. 18, 2010.

International Search Report and Written Opinion dated Feb. 21, 2012, International Application No. PCT/US2011/066244, 8 pages.

* cited by examiner

COMMUNICATIONS SERVICE BROKER FOR PREVENTING VOICEMAIL TROMBONING IN THE TELECOMMUNICATIONS NETWORK

CLAIM OF PRIORITY

The present application claims the benefit of the following U.S. Provisional Patent Application, which is incorporated by reference herein in its entirety:

U.S. Provisional Patent Application No. 61/425,692, entitled "COMMUNICATIONS SERVICE BROKER FOR MEDIATION AND ORCHESTRATION OF SERVICES IN THE TELECOMMUNICATIONS NETWORK," by Tzach Livyatan et al., filed on Dec. 21, 2010.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates to mobile communications and in particular to voicemail and call forwarding in telecommunications networks.

BACKGROUND

Given the recent dramatic growth in wireless and cellular communications, more and more businesses and other entities are integrating themselves with mobile device technologies. In addition to standard voice features, modern cellular phones and similar devices provide countless other services, such as Internet access, electronic mail (email), short messaging service (SMS) texting, digital cameras, multimedia messaging service (MMS), Bluetooth, gaming, various web-based applications and the like. As a result, telecommunication carriers and network operators have been under increased pressure to provide more and more service offerings to their subscribers. Today's network operator wants to attract new customers while retaining existing ones, develop profitable new business models, improve returns and launch new services as quickly as possible.

Given all of this pervasiveness of mobile devices, users are quickly becoming used to taking their phones everywhere, including traveling to other countries and continents with different telecom networks and respective network operators. During such remote trips, the user's device is typically in a roaming mode, meaning that it is connected to wireless service in a location that is different from the home location where the service was originally registered. Roaming can ensure that the mobile device maintains connectivity to a network, however it often incurs additional charges for the user.

One problem that can arise in the context of wireless roaming is voicemail tromboning. Voicemail tromboning, sometimes also referred to as voicemail forwarding, can occur when a mobile phone that is in roaming mode receives an incoming call and allows it to go to voicemail, thereby forwarding the call back from the roaming network to a voicemail server back in the user's home network. In other words, this situation may cause two unnecessary international call-legs to occur when a mobile terminated call is forwarded back home while the subscriber is roaming. This extra hop of the incoming phone call can incur roaming fees, which is usually unexpected and is seen as unfair by many subscribers. For example, the subscriber may be roaming in a different country and get charged a substantial monetary amount twice (the first time for the call being delivered to the roaming handset device, and the second time for forwarding the call back to the subscriber's country to be handled by the voicemail server). In several countries, regulation has been enacted to prevent callers from being charged twice in such a manner. In light of this, a technique is desirable for preventing voicemail tromboning and similar problems caused by various forwarding of mobile calls, while still maintaining all connectivity and other services provided by the network operator.

BRIEF SUMMARY

In accordance with various embodiments of the invention, a set of techniques are described for preventing the problem of voicemail tromboning. The techniques can be implemented with a service broker or another intermediate entity having a connection to a telecommunications network, such as a GSM network. The service broker can be positioned to receive an incoming call from a switch in a home network of the subscriber. The service broker can then determine that a recipient device of the incoming call is roaming in a visited network (such as by contacting a home location register). If it is determined that the subscriber is roaming, the service broker can contact a remote switch in the visited network and instruct the remote switch in the visited network to disable late call forwarding prior to relaying the incoming call message to the remote switch. Late Call Forwarding is a feature on some telephone networks allowing an incoming call to a called party to be redirected to a third party after the call signaling has arrived to the called party visited network. The forwarding can be a result of the called party, busy not answer, or other. This is different from an Early Call Forwarding, in which the call signaling is forward before the call is leaving the home network. In accordance with the described embodiment, once the late call forwarding is disabled, the service broker can then be responsible for contacting the voicemail server in the home network of the subscriber so that the subscriber can still have access to voicemail.

DETAILED DESCRIPTION

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

In accordance with various embodiments of the invention, a set of functionality is described that can be used to prevent voicemail tromboning. In accordance with an embodiment, this functionality can be utilized in a communications service broker deployed by a telecommunications network operator. In alternative embodiments, the functionality can be performed within other platforms and/or entities having a connection to the telecom network, such as the Global System for Mobile communications (GSM) network.

In accordance with an embodiment, a service broker can be used to perform mediation between applications (service logic) and different networks, as well as orchestration of services to enable compilations of multiple applications for a single call or session. The mediation feature provides applications with access to switching and session call control layers in different network domains, together with the required protocol. The orchestration of services enables different types of applications to work together to build new composite service offerings within the context of a single call. The service broker can be implemented as software, hardware, or a combination thereof. In accordance with an embodiment, the service broker is extended with a set of features that enhance and provide additional functionality for the network operator and/or other service providers in the context of telecom domain. In particular, the service broker is extended with functionality that can be used to prevent voicemail tromboning.

In accordance with an embodiment, the service broker can serve as an intermediate entity to prevent voicemail tromboning that can otherwise occur during international calls or call roaming. Tromboning is two unnecessary international call-legs that occur when a mobile terminated call is forwarded back home while a subscriber is roaming.

Figure 1:
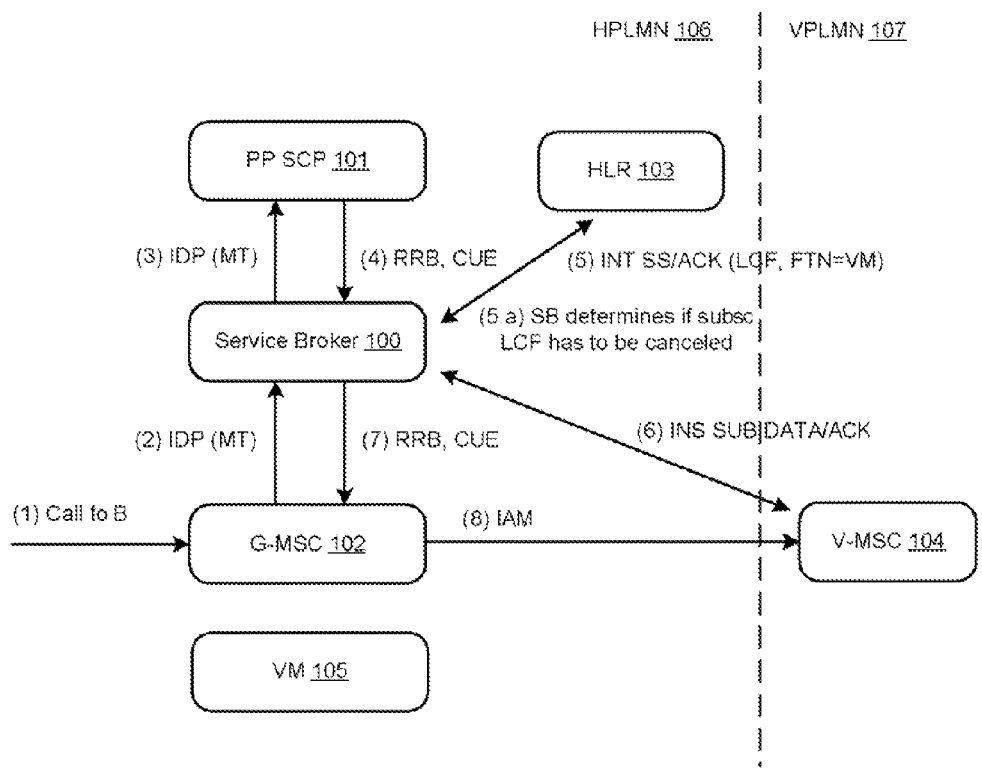
FIG. 1 is an illustration of voicemail tromboning prevention, in accordance with various embodiments of the invention.

FIG. 1 is an illustration of voicemail tromboning prevention, in accordance with various embodiments of the invention. Although this diagram depicts components as logically separate, such depiction is merely for illustrative purposes. It will be apparent to those skilled in the art that the components portrayed in this figure and in other figures can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the service broker 100 can reside in the subscriber's home public land mobile network (HPLMN) 106. In this particular illustration, it is assumed that the subscriber is roaming in a visited public land mobile network (VPLMN) 107, which can be located in a different country from the subscriber's HPLMN 106. As shown in step 1, an incoming call can be received by a switch G-MSC (Gateway Mobile Switching Center) 102 in the subscriber's home network (e.g. U.S.). This switch can then initiate an IDP message (2) to the service broker 100, in order to inform the service broker that a call has come in. In steps (3) and (4) the service broker 100 communicates with the prepaid service control point (PP SCP) 101 to obtain approval for making the call. Once the call is approved, the service broker 100 contacts (5) the home location register (HLR) 103 to get the location of the subscriber.

Once the service broker obtains the location of the subscriber, it can determine whether the subscriber is roaming. If the subscriber is not roaming, then there is no tromboning and nothing out of the ordinary needs to be performed. If the subscriber is roaming however, then the service broker 100 determines that late call-forwarding (LCF) should be disabled (5.a). LCF is the feature that would normally cause the voicemail server in the visited network to forward the call to the voicemail server in the home network. To disable LCF, the service broker contacts the visited mobile switching center (VMSC 104), i.e. the voicemail switch in the visited network (6). Once the service broker gets the acknowledgement that LCF has been disabled in the visited network, it can forward the call back to the G-MSC switch 102 in the home network (7). The G-MSC 102 can then transmit the call to the V-MSC 104 in the visited network. If the subscriber does not answer the call while roaming in the VPLMN 107, the V-MSC 104 will not forward the call to the voicemail server 105 in the HPLMN 106. The reason for this is because the service broker 100 had previously disabled late call forwarding with message (6) to the V-MSC 104. Therefore, the subscriber will not get the voicemail from the switch in the visited network, but instead will receive the voicemail from the switch in the home network 106, as will be shown in more detail in FIGS. 2 and 3.

Figure 2:
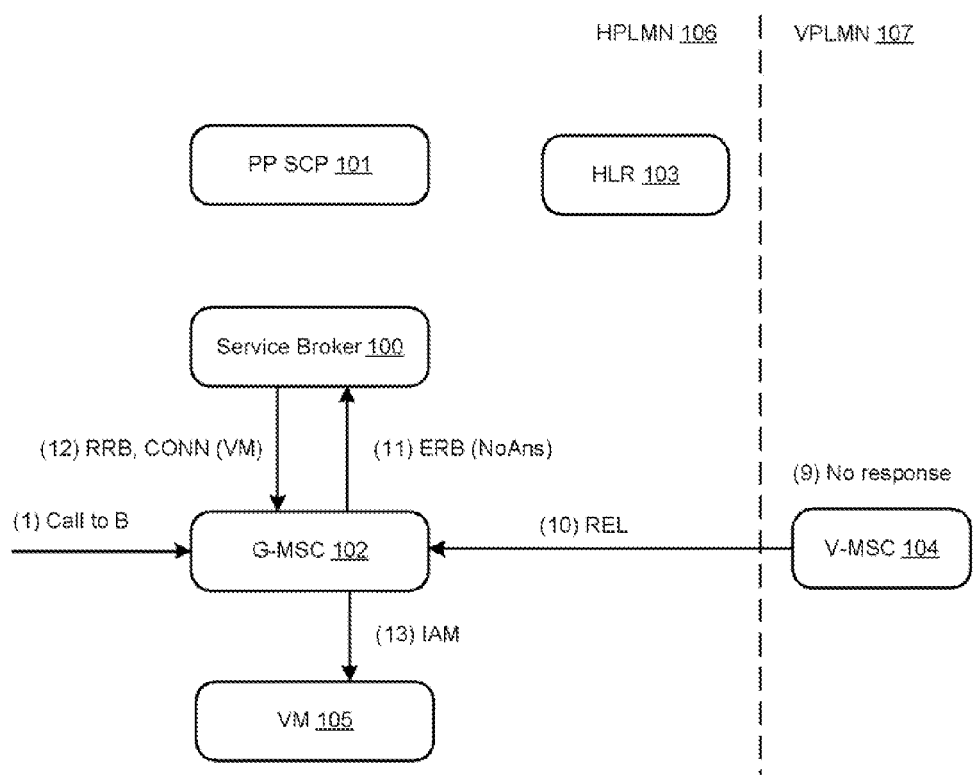
FIG. 2 is a continuing illustration of voicemail tromboning prevention, in accordance with various embodiments of the invention.

FIG. 2 is a continuing illustration of voicemail tromboning prevention, in accordance with various embodiments of the invention. Although this diagram depicts components as logically separate, such depiction is merely for illustrative purposes. It will be apparent to those skilled in the art that the components portrayed in this figure and in other figures can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, once the call is forwarded to the V-MSC 104 switch in the visited network 107, if the subscriber does not answer, the V-MSC 104 sends back a REL (release) message (10) indicating that the subscriber device was not answered. No late-call forwarding occurs because the service broker has previously disabled LCF, as illustrated in FIG. 1. Once the G-MSC 102 in the home network 106 receives the REL message (10), it notifies the service broker 100 that the call was not answered (11) and the service broker forwards the call to the local voice mail server 105 (12, 13). In this manner, tromboning is prevented since the V-MSC switch 104 in the visited network was prevented from making a forward call back to the home voicemail server VM 105.

Figure 3:
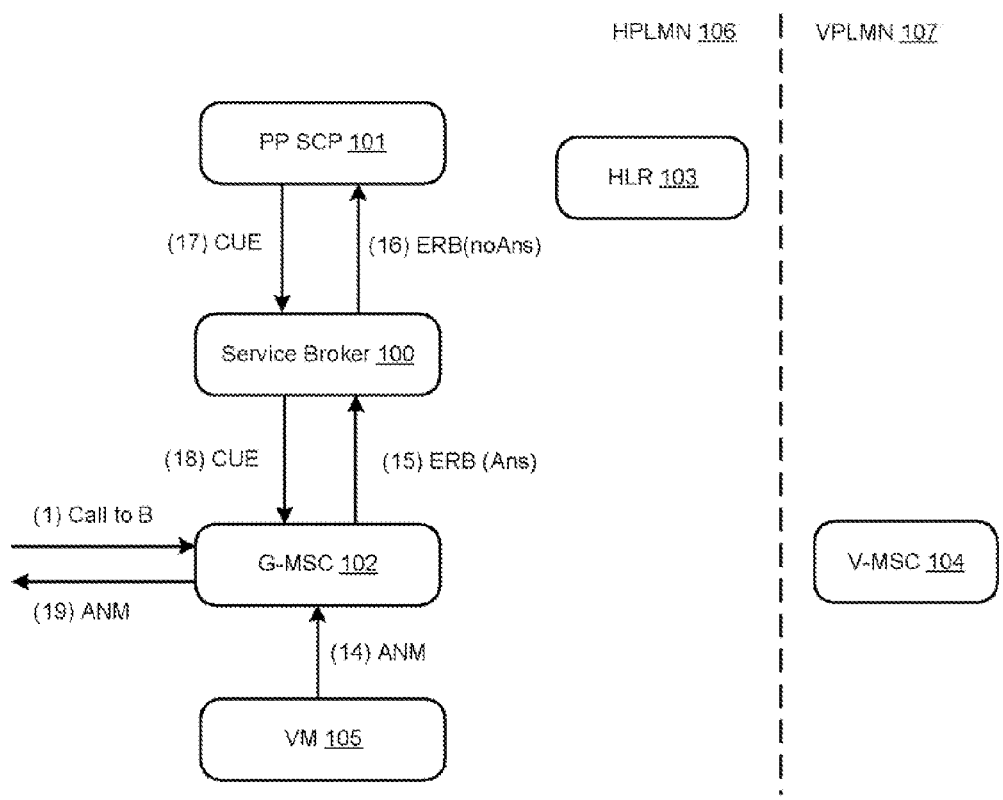
FIG. 3 is a continuing illustration of the voicemail tromboning prevention, in accordance with various embodiments of the invention.

FIG. 3 is a continuing illustration of the voicemail tromboning prevention, in accordance with various embodiments of the invention. Although this diagram depicts components as logically separate, such depiction is merely for illustrative purposes. It will be apparent to those skilled in the art that the components portrayed in this figure and in other figures can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, once the voicemail server VM 105 answers the call (14), the G-MSC switch 102 informs the service broker 100 of the answer (15). The service broker 100 in turn notifies the prepaid system PP-SCP 101 (16). If the PP-SCP approves it (17, 18), the G-MSC switch 102 is instructed to notify the calling party that the voicemail was answered (19). In this manner, the subscriber can still get their voicemail but without the tromboning of the call between multiple networks.

Throughout the various contexts described in this disclosure, the embodiments of the invention further encompass computer apparatus, computing systems and machine-readable media configured to carry out the foregoing systems and methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. In various embodiments, the transmission may include a plurality of separate transmissions.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A method for preventing voicemail tromboning in a telecommunications network environment, said method comprising:

receiving an incoming call message from a switch in the home public land mobile network (HPLMN) with a voicemail server, wherein the incoming call message is received by a gateway mobile switching center (G-MSC) in the HPLMN and forwarded to a service broker, wherein the service broker contacts a prepaid service control point (PP SCP) to obtain approval for establishing a call;

determining that a recipient device of said incoming call message is roaming in a visited public land mobile network (VPLMN);

contacting a visited switch in the VPLMN, capable of forwarding calls to the voicemail server in the HPLMN, directly instructing, by a service broker on the HPLMN, the visited switch in the VPLMN to disable a late call forwarding in the VPLMN;

once the late call forwarding is disabled, contacting, via the service broker, the voicemail server in the HPLMN to verify that the recipient device of said incoming call still has access to the voicemail server;

confirming, at the service broker, that the late call forwarding has been disabled for the incoming call message in the visited switch;

upon confirming that the late call forward has been disabled, relaying, by the service broker, the incoming call message to the visited switch in the VPLMN, wherein if the incoming call message is not answered by the recipient device, the visited switch does not forward the incoming call to the voicemail server in the HPLMN and instead responds to the switch in the HPLMN with a message indicating that the subscriber device was not answered by the recipient device;

once the switch in the HPLMN receives the message from the visited switch, notifying, via the switch in the HPLMN, the service broker that the incoming call message was not answered by the recipient device;

forwarding, via the service broker, the incoming call message to the voicemail server in the HPLMN, which answers the incoming call message; and after answering the incoming call message by the voicemail server in the HPLMN, informing, via the switch in the HPLMN, the service broker of the answer, wherein the service broker notifies the PP SCP that the incoming call message was answered by the voicemail server in the HPLMN;

wherein if the PP SCP responds to the service broker with approval, the switch in the HPLMN is instructed to notify the party originating the call that the incoming call message was answered by the voicemail server in the HPLMN.

2. The method of claim 1, wherein the service broker contacts a home location register (HLR) to obtain a location of said recipient device after the service broker obtains approval from the PP SCP.

3. A non-transitory computer readable storage medium storing a set of instructions, said instructions, when executed by one or more hardware processors, causing the one or more hardware processors to carry out a set of steps comprising:

receiving an incoming call message from a switch in the home public land mobile network (HPLMN) with a voicemail server, wherein the incoming call message is received by a gateway mobile switching center (G-MSC) in the HPLMN and forwarded to a service broker, wherein the service broker contacts a prepaid service control point (PP SCP) to obtain approval for establishing a call;

determining that a recipient device of said incoming call message is roaming in a visited public land mobile network (VPLMN);

contacting a visited switch in the VPLMN, capable of forwarding calls to the voicemail server in the HPLMN, directly instructing, by a service broker on the HPLMN, the visited switch in the VPLMN to disable a late call forwarding in the VPLMN;

once the late call forwarding is disabled, contacting, via the service broker, the voicemail server in the HPLMN to verify that the recipient device of said incoming call still has access to the voicemail server;

confirming, at the service broker, that the late call forwarding has been disabled for the incoming call message in the visited switch;

upon confirming that the late call forward has been disabled, relaying, by the service broker, the incoming call message to the visited switch in the VPLMN, wherein if the incoming call message is not answered by the recipient device, the visited switch does not forward the incoming call to the voicemail server in the HPLMN and instead responds to the switch in the HPLMN with a message indicating that the subscriber device was not answered by the recipient device;

once the switch in the HPLMN receives the message from the visited switch, notifying, via the switch in the HPLMN, the service broker that the incoming call message was not answered by the recipient device;

forwarding, via the service broker, the incoming call message to the voicemail server in the HPLMN, which answers the incoming call message; and after answering the incoming call message by the voicemail server in the HPLMN, informing, via the switch in the HPLMN, the service broker of the answer, wherein the service broker notifies the PP SCP that the incoming call message was answered by the voicemail server in the HPLMN;

wherein if the PP SCP responds to the service broker with approval, the switch in the HPLMN is instructed to notify the party originating the call that the incoming call message was answered by the voicemail server in the HPLMN.

4. The non-transitory computer readable storage medium of claim 3, wherein the service broker contacts a home location register (HLR) to obtain a location of said recipient device after the service broker obtains approval from the PP SCP.

5. A system comprising a physical storage memory and one or more hardware processors that execute a sequence of instructions to perform steps comprising:

receiving an incoming call message from a switch in the home public land mobile network (HPLMN) with a voicemail server, wherein the incoming call message is received by a gateway mobile switching center (G-MSC) in the HPLMN and forwarded to a service broker, wherein the service broker contacts a prepaid service control point (PP SCP) to obtain approval for establishing a call;

determining that a recipient device of said incoming call message is roaming in a visited public land mobile network (VPLMN);

contacting a visited switch in the VPLMN, capable of forwarding calls to the voicemail server in the HPLMN, directly instructing, by a service broker on the HPLMN, the visited switch in the VPLMN to disable a late call forwarding in the VPLMN;

once the late call forwarding is disabled, contacting, via the service broker, the voicemail server in the HPLMN to verify that the recipient device of said incoming call still has access to the voicemail server;

confirming, at the service broker, that the late call forwarding has been disabled for the incoming call message in the visited switch;

upon confirming that the late call forward has been disabled, relaying, by the service broker, the incoming call message to the visited switch in the VPLMN, wherein if the incoming call message is not answered by the recipient device, the visited switch does not forward the incoming call to the voicemail server in the HPLMN and instead responds to the switch in the HPLMN with a message indicating that the subscriber device was not answered by the recipient device;

once the switch in the HPLMN receives the message from the visited switch, notifying, via the switch in the HPLMN, the service broker that the incoming call message was not answered by the recipient device;

forwarding, via the service broker, the incoming call message to the voicemail server in the HPLMN, which answers the incoming call message; and after answering the incoming call message by the voicemail server in the HPLMN, informing, via the switch in the HPLMN, the service broker of the answer, wherein the service broker notifies the PP SCP that the incoming call message was answered by the voicemail server in the HPLMN;

wherein if the PP SCP responds to the service broker with approval, the switch in the HPLMN is instructed to notify the party originating the call that the incoming call message was answered by the voicemail server in the HPLMN.

6. The method of claim 1, wherein the service broker performs mediation between applications and different networks as well as orchestration of services to enable compilations of multiple applications for a single call.

7. The method of claim 1, wherein the service broker is implemented as software, hardware, or a combination thereof.

8. The non-transitory computer readable storage medium of claim 3, wherein the service broker performs mediation between applications and different networks as well as orchestration of services to enable compilations of multiple applications for a single call.

9. The non-transitory computer readable storage medium of claim 3, wherein the service broker is implemented as software, hardware, or a combination thereof.

10. The non-transitory computer readable storage medium of claim 3, wherein if the PP SCP responds to the service broker with approval, the switch in the HPLMN is instructed to notify a party originating the call that the incoming call message was answered.

11. The system of claim 5, wherein the service broker performs mediation between applications and different networks as well as orchestration of services to enable compilations of multiple applications for a single call.

12. The system of claim 5, wherein the service broker is implemented as software, hardware, or a combination thereof.

13. The system of claim 5, wherein the service broker contacts a home location register (HLR) to obtain a location of said recipient device after the service broker obtains approval from the PP SCP.

14. The system of claim 5, wherein if the PP SCP responds to the service broker with approval, the switch in the HPLMN is instructed to notify a party originating the call that the incoming call message was answered.

15. The method of claim 1, wherein the service broker receives an acknowledgement that said late call forwarding was disabled.

16. The non-transitory computer readable storage medium of claim 3, wherein the service broker receives an acknowledgement that said late call forwarding was disabled.

17. The system of claim 5, wherein the service broker receives an acknowledgement that said late call forwarding was disabled.

\* \* \* \* \*